(12) United States Patent  (10) Patent No.: US 6,598,580 B2
Baumann et al.  (45) Date of Patent: Jul. 29, 2003

(54) INSERT FILTER

(75) Inventors: Christoph Baumann, Moeglingen (DE); Timo Dirnberger, Marbach (DE); Steffen Holtz, Mettmann (DE); Daniel Hoppmann, Duesseldorf (DE); Ulrich Huengsberg, Essen (DE); Volker Hueppmeier, Paderborn (DE); Hans-Juergen Isensee, Marbach (DE); Stefan Maier, Besigheim (DE); Kai Mierau, Mettmann (DE); Hans-Peter Scholl, Mundelsheim (DE); Stefan Weiss, Munich (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/904,571

(22) Filed: Jul. 16, 2001

(65) Prior Publication Data

US 2002/0029549 A1 Mar. 14, 2002

(30) Foreign Application Priority Data

Jul. 15, 2000 (DE) .......................................... 100 34 487

(51) Int. Cl.⁷ .............................................. B01D 29/00
(52) U.S. Cl. .................................. 123/198 E; 55/385.3
(58) Field of Search ..................... 123/198 E; 55/385.3, 55/481, 506, 493, 502

(56) References Cited

U.S. PATENT DOCUMENTS 5,078,765 A * 1/1992 Schollhorn et al. ........... 55/481
5,125,941 A * 6/1992 Ernst et al. .................... 55/480
5,611,728 A * 3/1997 Arold .......................... 454/158

FOREIGN PATENT DOCUMENTS

DE 40 21 460 A1 * 1/1992
DE 42 34 047 C1 * 8/1993
DE 197 22 270 A1 * 3/1998

* cited by examiner

Primary Examiner—Noah P. Kamen
Assistant Examiner—Hyder Ali
(74) Attorney, Agent, or Firm—Crowell & Moring LLP

(57) ABSTRACT

An insert filter 10 for cleaning a gas stream, particularly for the intake air of an internal combustion engine or an air-conditioning unit, which includes a filter frame 11, a filter element 12 placed in the filter frame 11, and a shaft cover 13 and which is placed in the shaft 14 of a duct system 15 that guides the gas stream such that an unfiltered side 16 is separated from a clean side 17 by the filter element 12 and the filter frame 11. The shaft cover 13 closes a shaft opening 24 through which the insert filter 10 is inserted in the shaft 14. The filter frame 11 is connected to the shaft cover 13 so that the filter frame 11 can be removed from the shaft 14 without any need for additional removal aids by simply pulling on the shaft cover 13.

10 Claims, 7 Drawing Sheets

INSERT FILTER

BACKGROUND OF THE INVENTION

The invention relates to an insert filter for cleaning a gas stream, which is replaceably positioned in a shaft of a duct system through which the gas stream is guided, and which comprises a filter frame, a filter element supported by the filter frame, and a shaft cover for closing an opening through which the filter is inserted into the shaft.

A filter, accommodated by an adapter, which is inserted in a shaft of a channel of a ventilation or air-conditioning unit is known from DE 42 34 047. The shaft is closed with a cover and clamped with clamps. The clamps can be displaced on locking bars. The locking bars are located both on the cover and on the channel. The filter has a filter frame, three sides of which are inserted in the shaft, with the cover forming the fourth side of the filter frame and also being inserted in the shaft. The shaft is constructed in such a way that it tapers continuously beginning at an insertion side, so that the force necessary to insert the filter is low and seals only come to bear against the filter when it is completely installed. The seals, which lie opposite the insertion side, are pressed firmly against the shaft when the cover is locked with the shaft.

To remove the filter from the shaft, the clamps must first be pushed aside. Subsequently, a pull is necessary, which pulls the filter out of the shaft. However, in order to transmit this pull to the filter, an additional removal aid is necessary because the cover itself is not positioned in the shaft in such a way that it can be readily grasped. This removal aid is thus absolutely necessary for every replacement of the filter. The use of an additional removal aid is, however, troublesome and if the removal aid is lost, the filter cannot be replaced.

SUMMARY OF THE INVENTION

Accordingly, it is an object of the invention to provide an insert filter, which can be placed in a shaft of a duct system for guiding gas flow, such that the insert filter can be removed from the shaft without additional removal aids.

This and other objects are achieved in accordance with the present invention by providing an Insert filter for cleaning a gas stream, which is replaceably positioned in a shaft of a duct system through which the gas stream is guided such that the filter separates an unfiltered side from a clean side, the filter comprising a filter frame, a filter element supported by the filter frame, and a shaft cover, wherein the shaft cover is constructed separately from the filter frame and attached thereto, and wherein the filter frame is removable from the shaft exclusively by using the shaft cover.

The insert filter according to the invention is positioned in the shaft of a duct system for guiding a gas stream and serves to purify a gas stream. The duct system can, for example, guide intake air for an internal combustion engine, ventilation air for a clean room, or another gas for a gas consumer. The insert filter is formed by a filter frame, a filter element supported by the filter frame, and a shaft cover connected with the filter frame, with the filter element able to be formed by a filter medium with a border or by a filter medium alone, such as a non-woven fabric or paper.

Furthermore, the filter frame may be comprised of a great variety of materials such as nonwoven webs, thermoplastic, or metal. The insert filter is placed in the shaft in such a way that it separates an unfiltered side from a clean side.

Depending on the filter element with its filter unit, a leakage airflow between the insert filter and the shaft may or may not be permissible. For a coarse filter element, which only filters out coarse impurities, a certain leakage airflow is permissible. For a fine filter element, such as for clean rooms, no leakage airflow is acceptable. In this case, a seal is to be provided between the insert filter and the shaft which, for example, can be positioned on the shaft.

The filter frame, which is completely inside the shaft, is connected with the shaft cover so that the insert filter can be removed from the shaft without an additional removal aid. For this purpose, the side of the filter frame facing the shaft cover can be constructed as taller than the other sides. In this way, a larger connection surface is available for attachment of the shaft cover to the filter frame. The shaft cover is constructed in such a way that it can be easily grasped for replacement of the insert filter. This can be achieved by, for example, a bulge or recesses. The connection existing between the filter frame and the shaft cover is constructed in such a way that the pull necessary for removal of the insert filter from the shaft can be transmitted. The shaft can run partially or completely at a slant in the direction from the top of the shaft to the bottom of the shaft, thereby making introduction of the insert filter into the shaft easier.

The shaft cover can be attached removably or permanently to the filter frame. In this regard, a permanent connection can be produced by, for example, gluing or welding. Removable connections between the shaft cover and filter frame can be formed by positive fits or non-positive fits. For this purpose, screws, hooks, clamps, springs, or fits, for example, can be used. Furthermore, the shaft cover can be inserted in a receiver groove on the filter frame. In other embodiments, the receiver groove can also be positioned on the shaft cover.

The shaft cover can have fastening means available with which the shaft cover is connected with the shaft, so that uncontrolled detachment of the insert filter from the shaft is prevented. Screws, catches, or frets can, for example, serve for this purpose.

According to a further embodiment of the invention, the connection between the filter frame and the shaft cover is constructed so as to be separable. In this way, the shaft cover can be separated from the filter frame after the filter frame is removed from shaft. This is particularly advantageous for replaceable filters in which the filter frame and the filter element must be disposed of, because the shaft cover can be used again. The use of snap hooks to connect the filter frame with the shaft cover represents an advantageous solution, because no additional fastening means are necessary, so that assembly time and expense can be minimized. The shaft cover is snapped onto the filter frame, with the snap hooks springing back and holding the filter frame together with the shaft cover in the assembled state.

It is advantageous to provide an integrated removal aid on the shaft cover, whereby the pull necessary for removal can be better transmitted to the shaft cover. This integrated removal aid can, for example, be formed by an lifting strap, a grip hollow, or a handle. The handle can have one or more attachment points available on the shaft cover, whereby greatly varying embodiments such as a knob or a bow are conceivable.

A further variant of the invention provides a cover seal between the shaft cover and the shaft. This cover seal prevents the entrance of external gases or the escape of gases carried in the duct system and can be connected with the shaft cover or the shaft by, for example, being glued, clipped, or molded on. It is, however, also conceivable that the cover seal is placed loosely between the shaft and the shaft cover and, after the insert filter is completely inserted in the shaft, is pressed between the shaft and shaft cover. Furthermore, however, the cover seal can also be produced through the application of suitable materials such as silicone or adhesive between the shaft cover and the shaft.

A further variant of the invention has a peripheral frame seal on the filter frame which supports itself on the shaft. This frame seal is comprised of a material which has sealing properties, and for this purpose the frame seal can be formed of the same material as the filter frame or of some other material. The frame seal can be inserted loosely in, for example, a groove on the filter frame or, for example, be permanently connected with adhesive or by two-component injection molding with the filter frame. Furthermore, the frame seal can be constructed in various ways. One possibility provides for the use of a sealing lip which presses against the shaft when the filter frame is inserted into the shaft. Another possibility for implementing the frame seal is to position multiple small lamellae which press against the shaft.

It is advantageous to position a crossbrace on the filter frame to stabilize the filter element. This crossbrace can be formed by a lengthwise strut and a transverse strut, which offer the filter element support against sagging caused by the gas stream. Further embodiments having multiple lengthwise and/or transverse struts are conceivable. This crossbrace can, for example, be clamped in the filter frame or screwed onto it.

One particular embodiment of the connection of the crossbrace with the filter frame is a spring-groove connection, in which a specially constructed spring on the crossbrace engages in a groove in the filter frame, thereby fixing the filter element. This connection can, for example, be detached when the filter element is replaced and subsequently be produced again.

A specific embodiment of the invention is formed by the filter frame having a frame wall which encloses a filter region in which the filter element is inserted. In this embodiment, the filter element can, for example, be formed by a non-woven filter web, an activated carbon filter, a filter paper, or a felt, with this filter medium also able to be folded. The frame wall extends diagonally to (i.e. is slanted toward) the filter region, so that the inserted filter element is compressed in a lower peripheral region close to the frame wall. This compression of the filter element reduces the leakage between the filter frame and the filter element. For improved fixing of the filter element, the crossbrace can press the filter element deeper into the filter frame.

According to a particular embodiment of the invention, the insert filter according to the invention is intended as an air filter for an internal combustion engine. In the ever tighter spatial relationships in the engine compartment of a motor vehicle, a filter housing can hereby be conceived which can be opened at the top through the cover to replace the filter element. Therefore, no removal space is necessary for the filter element within the engine block. Rather, the filter element can be removed upward, i.e., in the direction where the filter housing abuts the engine hood. It is particularly advantageous to position a filter housing on both the right and the left of the engine block. In this case, further casings can connect these two filter housings with one another, whereby noise dampening can additionally be produced. In addition, the positioning of the filter elements on both sides further serves for optimal air distribution, for example for a combustion engine with a V-shaped layout of the cylinders.

These and other features of preferred embodiments of the invention, in addition to being set forth in the claims, are also disclosed in the specification and/or in the drawings, and the individual features each may be constructed in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
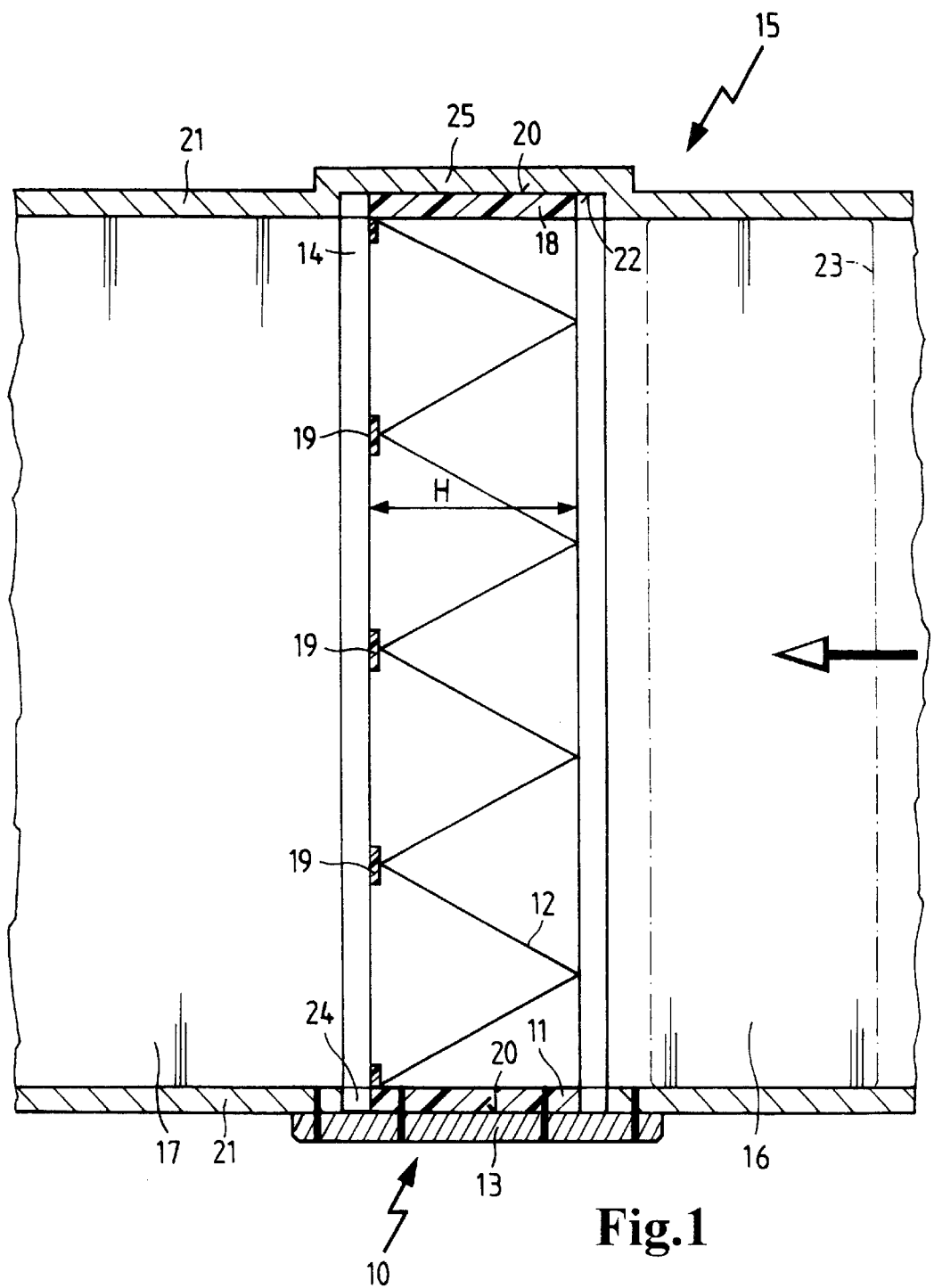
FIG. 1 shows a sectional view of an insert filter according to the invention in a shaft.

In FIG. 1, an insert filter 10 is illustrated in section. The insert filter 10 is formed by a rectangular filter frame 11 with a height H, a rectangular filter element 12 folded in a zigzag or pleated shape, and a shaft cover 13, with the filter element 12 also having the height H and being supported by the filter frame 11. In other embodiments, the filter element 12 may have a peripheral border (not shown) made of, for example, a rubber compound, to increase stability and to reduce leakage flow. The filter frame 11 has a peripheral, essentially constant frame wall 18, on which bearing points 19 for supporting the filter element 12 can be positioned, and is placed in a shaft 14 of a duct system 15 for guiding a gas stream. The duct system 15 is formed by a duct wall 21 and encloses a rectangular flow cross-section 23. However, flow cross-sections 23 with any desired geometrical configuration, such as oval or triangular, are also conceivable.

The shaft 14 is a part of the duct system 15 and has a shaft opening 24 and a shaft floor 25. The filter frame 11 is placed in the shaft 14, and its outside surface 20 presses against the interior surface 22 of the shaft 14, thereby separating an unfiltered side 16 from a clean side 17. In this illustrative embodiment, the shaft floor 25 is inset slightly, so that the filter element 12 can have, as much as possible, the same flow cross-section 23 as the duct system 15. The shaft cover 13 is connected to the outside 20 of the filter frame 11 and closes the shaft opening 24, so that no gas can escape from the duct system 15. The shaft cover 13 can be permanently connected to the filter frame 11 by, for example, gluing or welding, or it may be detachably connected by, for example, screwing or clamping.

In order to prevent the insert filter 10 from detaching from the shaft 14 in an uncontrolled way, the shaft cover 13 can be attached to the duct system 15 via the shaft opening 24, with the shaft cover 13 being constructed larger than the shaft opening 24. In this way, the shaft cover 13 will completely cover the shaft opening 24 and, in addition, also part of the duct wall 21 around the shaft opening 24.

Figure 2:
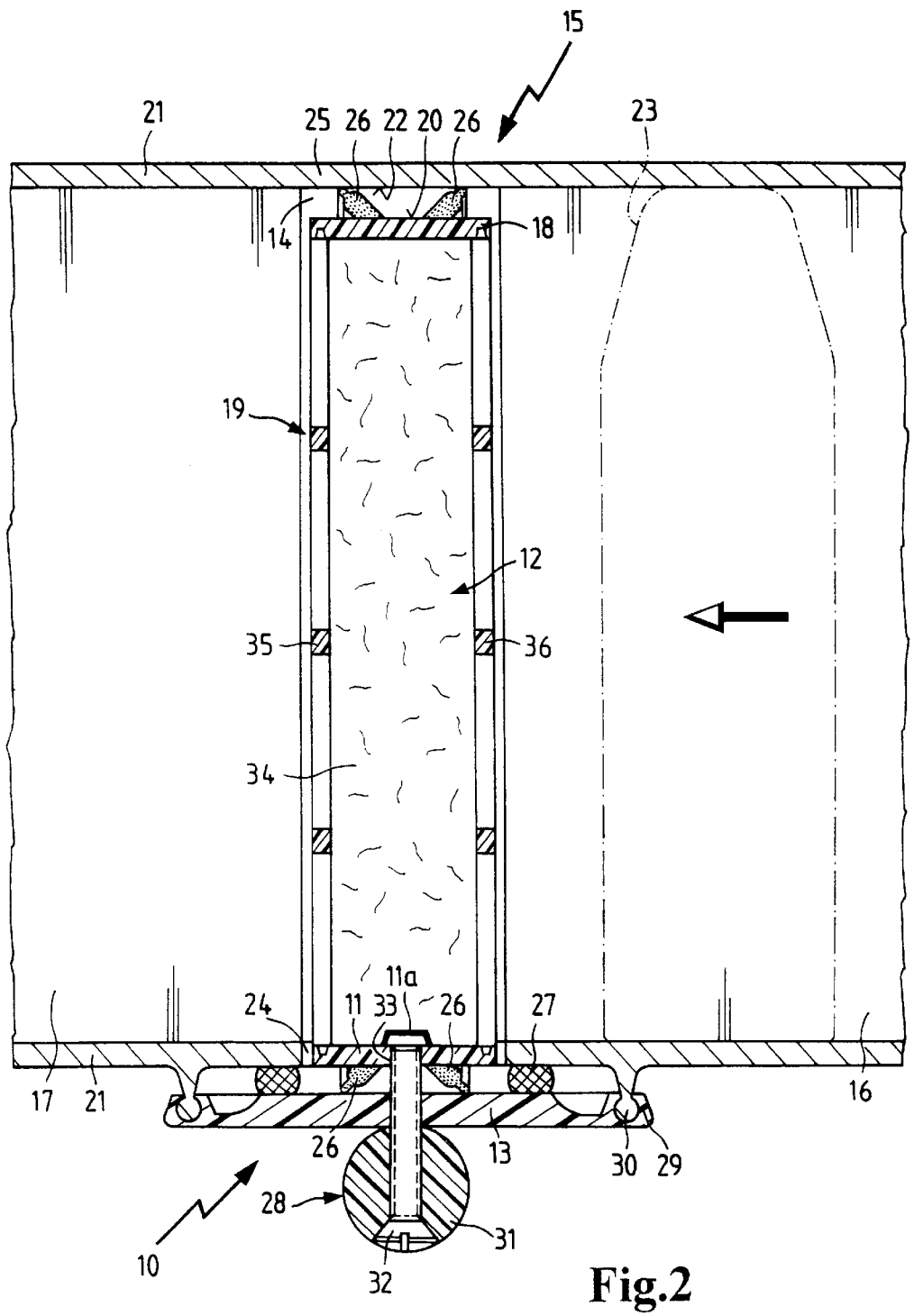
FIG. 2 shows a sectional view of an insert filter insert filter in a shaft.

In FIG. 2, an insert filter 10 is shown in section in the installed state. The insert filter 10 comprises a filter frame 11, a filter element 12, a shaft cover 13, a frame seal 26, and a removal aid 28, and is placed in the shaft 14, which has a shaft opening 24 and a shaft floor 25 lying opposite the shaft opening 24.

In this embodiment, the shaft floor 25 is constructed in the same plane with the duct wall 21 and is not offset as in FIG. 1. The filter frame 11 is constructed in such a way that it runs from the shaft opening 24 in the direction of the shaft floor 25, first rectangularly and then diagonally, thereby reducing the insertion force. In order to influence the flow relationships in the duct system 15 in a positive manner, the geometry of the filter frame 11 is tailored to the flow cross-section 23.

The frame seal 26 extends around the outer surface 20 of the filter frame 18 and presses against the inside surface 22 of the shaft 14. In the region of the shaft opening 24, the frame seal 26 extends between the filter frame 11 and the shaft cover 13, thereby preventing a leakage flow between the shaft cover 13 and the filter frame 11 and ensuring the separation between the unfiltered side 16 and the clean side 17. So that the gas flowing in the duct system 15 cannot leak out between the insert filter 10 and the duct wall 21, a cover seal 27 is positioned between them and the shaft cover 13 closing the shaft opening 24. The cover seal 27, in this illustrative embodiment, is formed by an O-ring, which is placed loosely between the shaft cover 13 and the duct wall 21. In other embodiments, shaped seals, which can be formed from various sealing materials, can be placed loosely or in recesses provided for this purpose (not shown).

To fix the insert filter 10 in the shaft 14, a peripheral recess 29 is located on the shaft cover 13, in which an attachment ridge 30 extending around the outside of the duct wall 21 engages and thus fixes the insert filter 10 in the shaft 14. To remove the insert filter 10 from the shaft 14, a removal aid 28 attached to the shaft cover 13 is provided, which is formed by a knob 31. The knob 31 is attached with a screw 32 to the shaft cover 13 and the filter frame 11. Other removal aids positioned on the shaft cover 13 are also possible, such as an annular nut. So that no gas will leak out between the screw 32 and the filter frame 11 and/or the shaft cover 13, a protective cap 11a is positioned in the filter frame 11 which forms a gas-tight cover over the screw 32 and the threaded bore 33 in which screw 32 is received.

The filter element 12 is formed by a non-woven filter web 34 which does not have a border. In order that the non-woven filter web 34 does not deform due to the gas flowing through it and leakage does not occur between the non-woven web 34 and filter frame 11, bearing points 19 are provided in the form of continuous bars 35, which are constructed in one piece with the filter frame 11. These bars 35 extend continuously parallel and/or perpendicularly to the frame wall 18. In order that the non-woven filter web 34 cannot fall out of the filter frame 11, a crossbrace 36 is mounted on the filter frame 11 opposite the bars 35, so that the non-woven filter web 34 is clamped between the bars 35 and the crossbrace 36. In this embodiment, crossbrace 36 is snapped onto the filter frame 11. In other embodiments, however, other types of attachment are also possible, such as screwing or welding.

Figure 3:
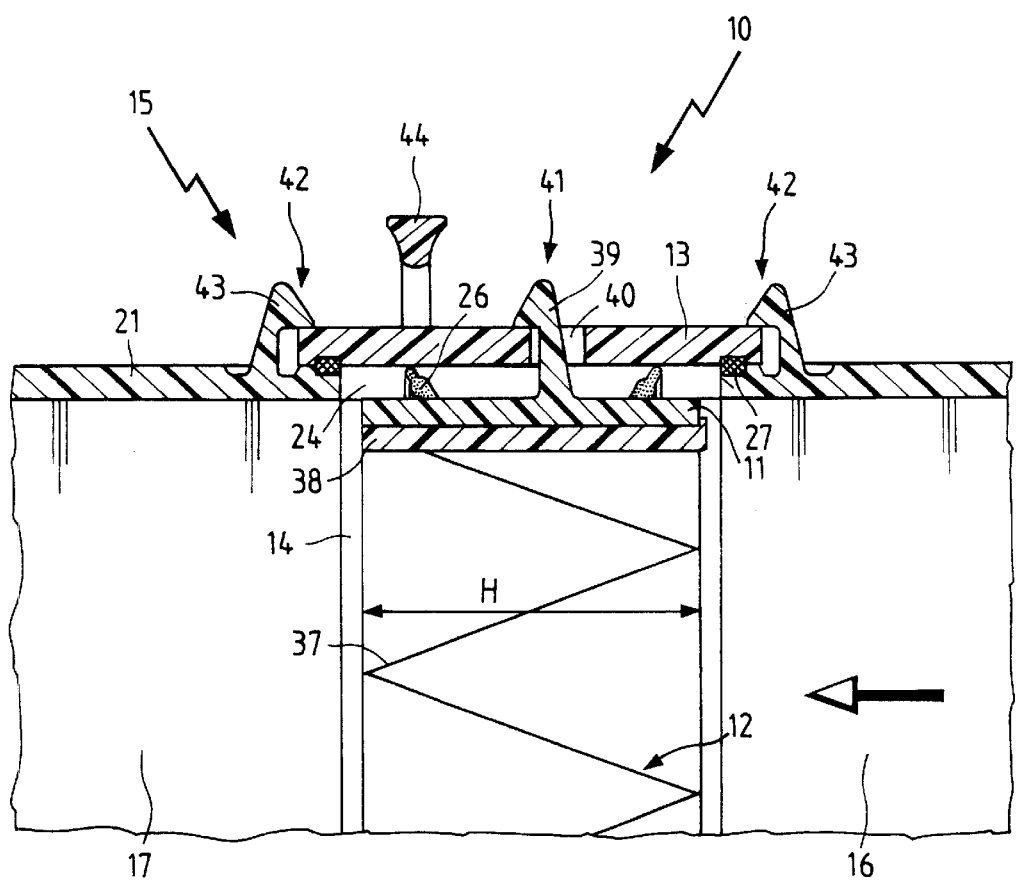
FIG. 3 is a partial sectional view of an insert filter according to the invention.
Figure 4:
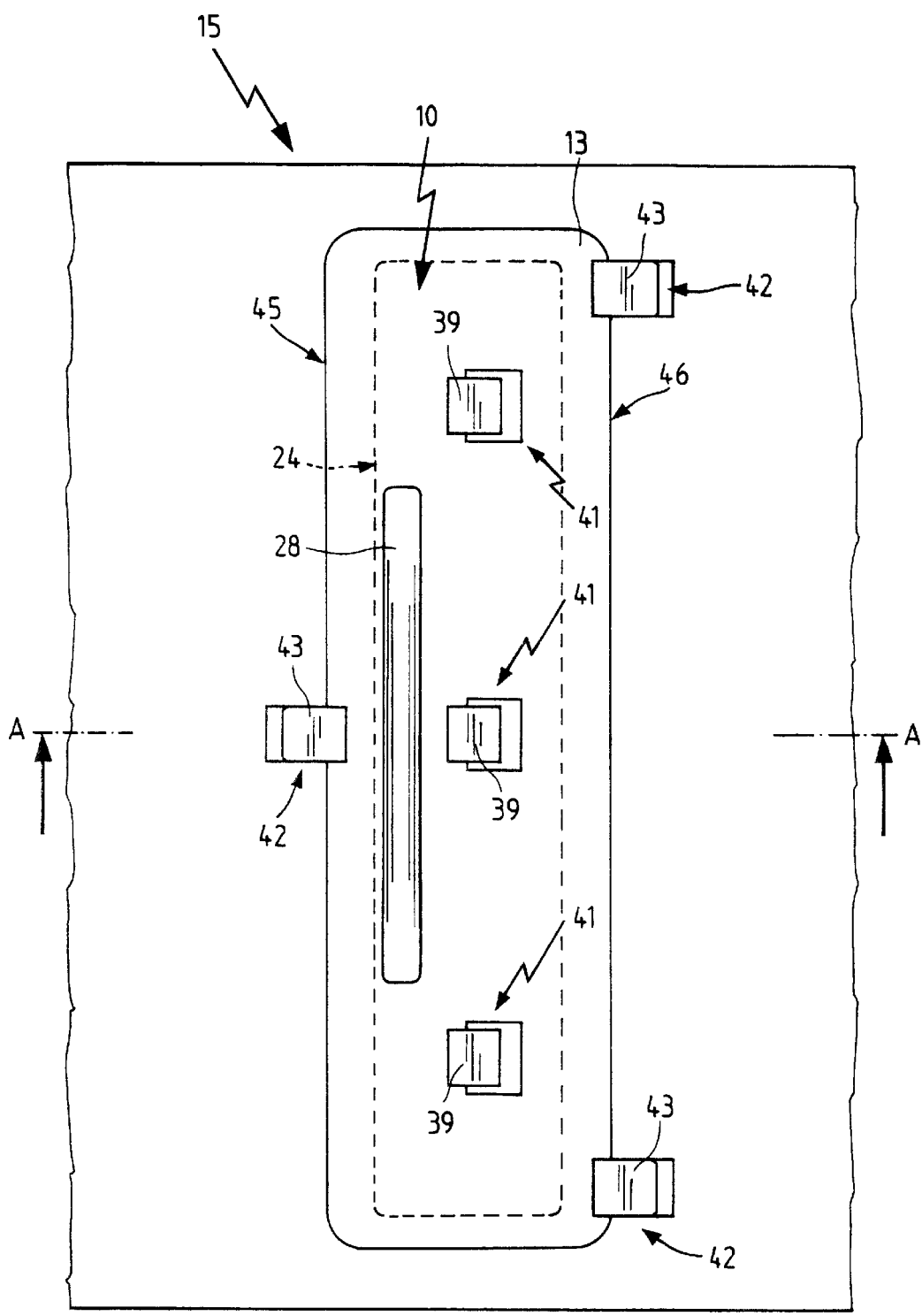
FIG. 4 is a top view of an insert filter in the installed state.

FIG. 3 shows a partial sectional view of an insert filter 10 in the installed state taken along the section line A—A of FIG. 4. The insert filter 10 is formed by a filter element 12, a filter frame 11, and a shaft cover 13. The filter element 12 is formed by a filter medium 37 folded in a pleated or zig-zag shape and a filter border 38 surrounding the filter medium 37 which is positioned between the filter medium 37 and the filter frame 11. The filter border 38 supports the filter medium 37 around the periphery and has sealing properties which prevent leakage between the filter medium 37 and the filter frame 11. To avoid a leakage flow between the filter frame 11 and the shaft cover 13, a peripheral frame seal 26 is provided, which is manufactured together with the filter frame 11 in a two-component injection molding process. To connect the filter frame 11 with the shaft cover 13, a snap hook 39 is provided which projects through an aperture 40 located in the shaft cover 13 and produces a first snap connection 41. To fix the insert filter 10 in the shaft 14, a second snap connection 42 is provided with hooks 43 which hold the shaft cover 13 over the shaft opening 24. To center the shaft cover 13, multiple second snap connections 42 are located opposite one another. The hooks 43 are connected with the duct wall 21 so that the shaft cover 43 is always installed in the same position. For installation, the hooks 43 are bent back until the shaft cover 13 is supported on the duct wall 21. When the shaft cover 13 is in place, the hooks 43 spring back and thus fix the shaft cover 13 over the shaft opening 24. A cover seal 27, which is located peripherally around the shaft opening 24, is provided so that no gas can flow out between the shaft cover 13 and the duct wall 21. To remove the insert filter 10 from the shaft 14, a grip or handle 44 in the form of a bow is provided which is permanently connected with the shaft cover 13 and can be easily grasped to facilitate removal of the insert filter 10.

FIG. 4 is a top view of an insert filter 10 according to FIG. 3 in the installed state. The shaft cover 13 completely closes the shaft opening 24. Three second snap connections 42 are provided so that the shaft cover 13 cannot move off center, with one single second snap connection 42 being located on a first lengthwise side 45 and two second snap connections 42 being located on a second lengthwise side 46 of the shaft cover 13. To optimize the attachment, further second snap connections 42 can be located distributed around the periphery of the shaft cover 13. Furthermore, the shaft cover 13 can be shaped in such a way that the hooks 43 are guided, thereby also fixing the shaft cover 13 transverse to the lengthwise sides 45, 46. In this illustrative embodiment, three first snap connections 41 with snap hooks 39 are provided which connect the filter frame 11 (not shown) with the shaft cover 13. The removal aid 28, which is permanently connected with the shaft cover 13, can be grasped by hand by the installer, and the insert filter 10 can thus be removed from the shaft 14 (not shown).

Figure 5:
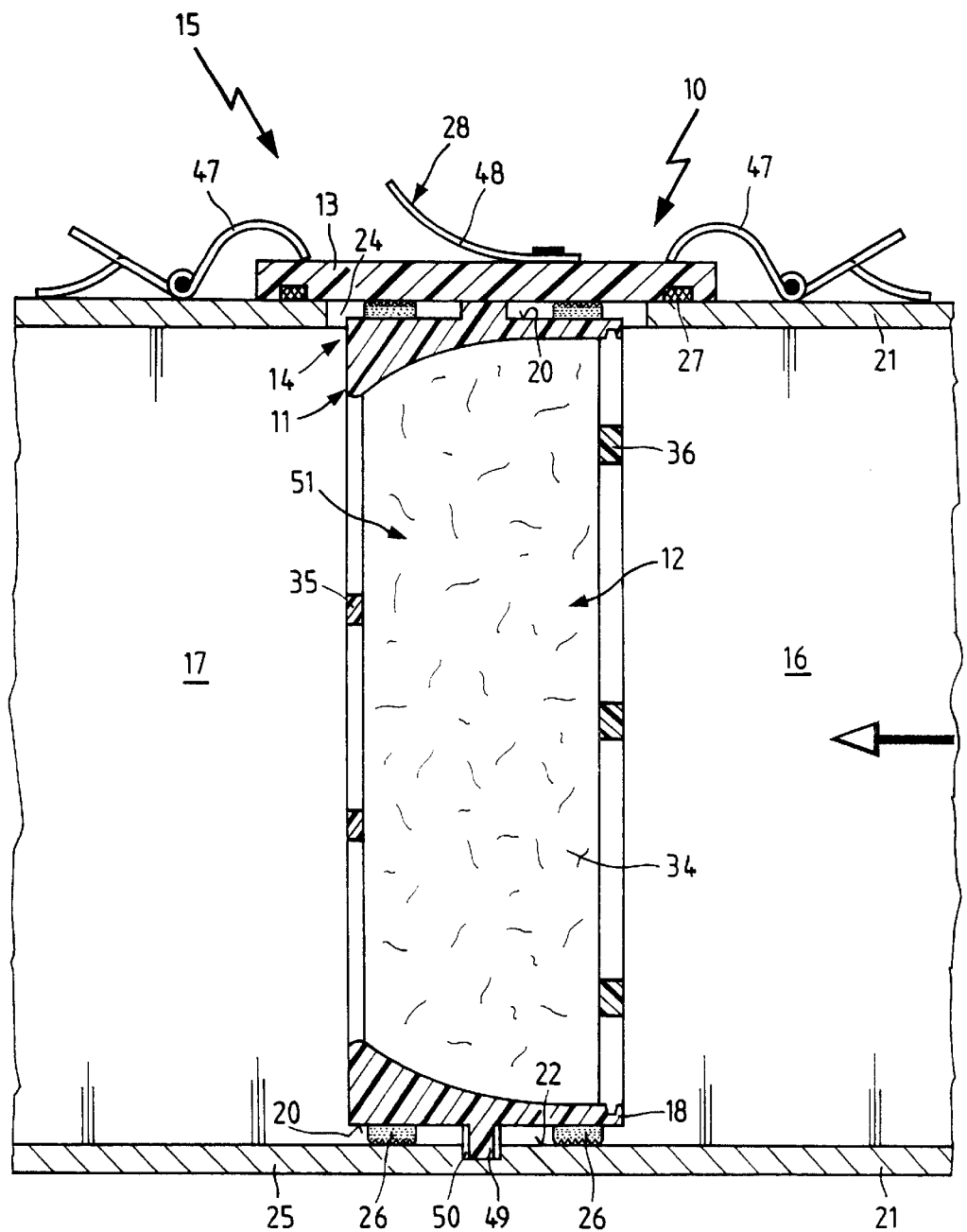
FIG. 5 is a sectional view of an insert filter in a shaft.

FIG. 5 is a sectional view of an insert filter 10 in the shaft 14. In this embodiment of the invention, the shaft cover 13 is fixed with clamping hooks 47 on the duct wall 21. The clamping hooks 47 can be opened for installation and closed when the insert filter 10 is in place. The clamping hooks 47 then clamp onto the shaft cover 13 and thus prevent uncontrolled detachment of the insert filter 10 even during vibrations and impacts. To remove the insert filter 10 from the shaft 14, a removal aid 28 in the form of a lifting strap 48 is provided, which is permanently connected with the shaft cover 13. By pulling on this lifting strap 48, the insert filter 10 is removed from the shaft 14. Because the lifting strap 48 is permanently connected with the housing cover 13, the insert filter 10 can be removed without an additional removal aid.

The filter frame 11 has an external guide strip 49 around its periphery which is guided in a guide groove 50. The guide groove 50 extends in the duct wall 21 from the shaft opening 24 across the shaft floor 25 to the other side of the shaft opening 24. The guide groove 50 and the guide strip 49 are designed relative to one another in such a way that a low amount of force is sufficient to insert the insert filter 10 into the shaft 14, with sufficient guiding nonetheless being assured. A peripheral frame seal 26 is located on both the left and the right of the guide strip 49.

The frame wall 18 of the filter frame 11 encloses a filter region 51 in which the filter element 12 is placed. The frame wall 18 is constructed peripherally in such a way that it has the lowest wall thickness in the vicinity of the crossbrace 36. The further the frame wall 18 extends in the direction of the bar 35, which lies opposite the crossbrace 36, the more the wall thickness increases, so that the filter area 51 in this region decreases in size. In this embodiment, the filter element 12 is formed by a non-woven filter web 34 which is constructed in the non-installed state as a parallelepiped, i.e., with six planar surfaces. After the non-woven filter web 34 is placed in the filter region 51, the planar surfaces which are in contact with the filter frame 11 are deformed, so that the non-woven filter web 34 is compressed in this area and leakage between the non-woven filter web 34 and the filter frame 11 is reduced. The crossbrace 36 and the bar 35 support the non-woven filter web 34 so that it does not fall out of the filter frame 11.

Figure 6:
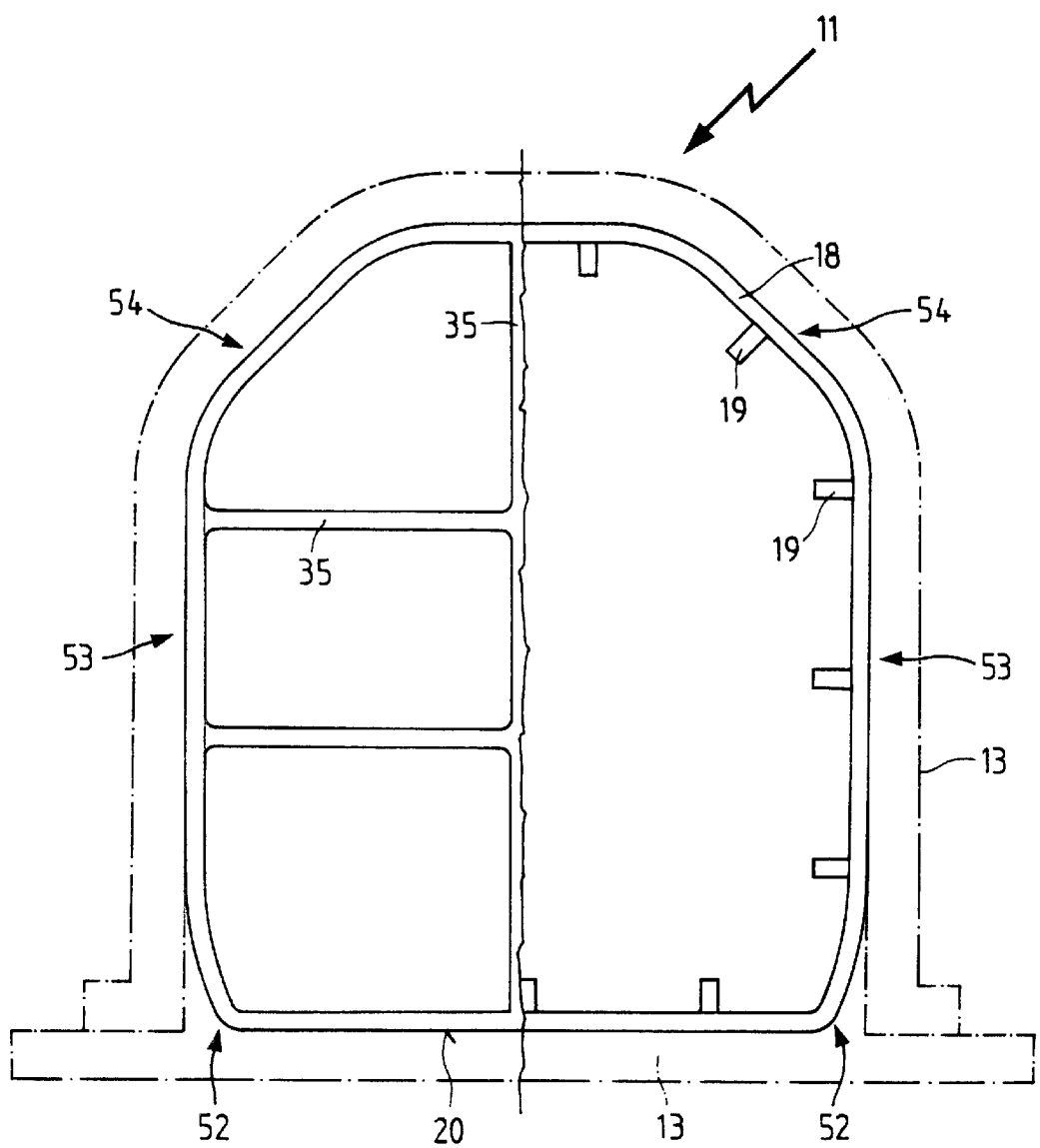
FIG. 6 shows a front elevation of a filter frame.

FIG. 6 is a front elevational view of a filter frame 11, with the left and the right halves of the image showing different embodiments. The filter frame 11 is designed to accommodate a flat filter (not shown) and has a peripheral frame wall 18 on which external peripheral frame seals 26 (not shown) can be located. The filter frame 11 has curves 52 which can be received by the shaft cover 13 (indicated with a broken line). A parallel region 53, in which the left and right frame walls 18 run parallel, adjoins the curves 52. An angular region 54, which is tailored to the shaft 14 (indicated with a broken line), adjoins the parallel region 53. The insertion force necessary for installation of the insert filter 10 is reduced by the angular region 54.

In order to support the filter element 12 (not shown) in the filter frame 11, bars 35 are provided, as illustrated in the left half of the drawing, which are manufactured in one piece with the filter frame 11 and/or with the frame wall 18. A two-part manufacture of the filter frame 11 with the bars 35 is, of course, also possible. These bars 35 extend perpendicular and parallel to the parallel regions 53 and are constructed narrow, thereby keeping the air resistance as low as possible. Other embodiments of the bars 35 may be wider an optionally may include air-permeable parts.

On the right half of the image, support points 19 are illustrated around the periphery on which the filter element rests and can support itself. These support points 19 can also be constructed as longer support struts.

Figure 7:
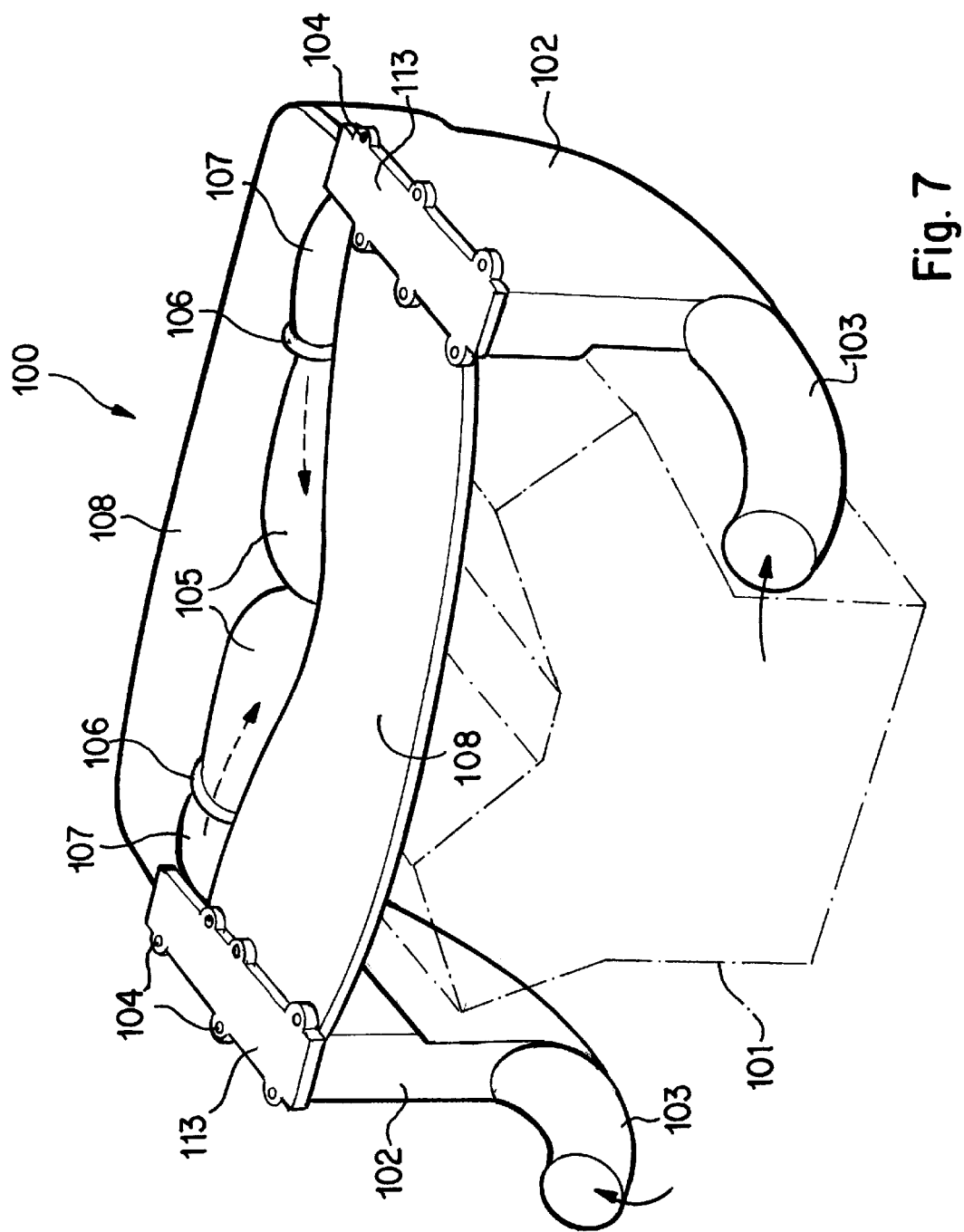
FIG. 7 is a perspective view of an insert filter according to the invention used as an air filter for an internal combustion engine.

In FIG. 7, a filter device 100 is illustrated which is intended for a schematically illustrated internal combustion engine 101. In this case, two filter housings 102 are used, which are located to the right and left of the motor 101 and have separate air intakes 103.

The filter housings 102 are provided with shaft covers 113, which allow the filter elements (not shown in detail) to be removed without difficulty from the filter housings 102. The shaft covers 113 are secured by means of screws 104.

Furthermore, outlet pipes 105 are provided which are attached by means of a flange connection 106 to outlets 107 of the filter housings 102 and ensure that the filtered intake air is conducted to the cylinder head of the internal combustion engine 101 as illustrated by the arrows shown in broken lines. The two filter housings 102 are connected with one another via coverings 108, with the coverings leading to noise damping of the internal combustion engine.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An insert filter for cleaning a gas stream, which is replaceably positioned in a shaft of a duct system through which said gas stream is guided such that the filter separates an unfiltered side from a clean side, said filter comprising a filter frame, a filter element supported by the filter frame, and a shaft cover, wherein the shaft cover is constructed separately from the filter frame and attached thereto, and wherein the filter frame is removable from the shaft exclusively by using the shaft cover, wherein the shaft cover is removably attached to the filter frame by snap hooks.

2. An insert filter for cleaning a gas stream, which is replaceably positioned in a shaft of a duct system through which said gas stream is guided such that the filter separates an unfiltered side from a clean side, said filter comprising a filter frame, a filter element supported by the filter frame, and a shaft cover, wherein the shaft cover is constructed separately from the filter frame and attached thereto, and wherein the filter frame is removable from the shaft exclusively by using the shaft cover, the insert filter further comprising an integrated removal mounted on said shaft cover.

3. An insert filter according to claim 2, wherein said integrated removal aid is a lifting strap.

4. An insert filter for cleaning a gas stream, which is replaceably positioned in a shaft of a duct system through which said gas stream is guided such that the filter separates an unfiltered side from a clean side, said filter comprising a filter frame, a filter element supported by the filter frame, and a shaft cover, wherein the shaft cover is constructed separately from the filter frame and attached thereto, and wherein the filter frame is removable from the shaft exclusively by using the shaft cover, the insert filter further comprising a peripheral seal on the filter frame which seals the filter frame relative to the shaft.

5. An insert filter according to claim 4, wherein said peripheral seal is molded together with the filter frame by two-component injection molding.

6. An insert filter for cleaning a gas stream, which is replaceably positioned in a shaft of a duct system through which said gas stream is guided such that the filter separates an unfiltered side from a clean side, said filter comprising a filter frame, a filter element supported by the filter frame, and a shaft cover, wherein the shaft cover is constructed separately from the filter frame and attached thereto, and wherein the filter frame is removable from the shaft exclusively by using the shaft cover, wherein a crossbrace is provided on the filter frame to stabilize the filter element thereon.

7. An insert filter according to claim 6, wherein the crossbrace is connected to the filter frame by a spring-groove connection.

8. An insert filter for cleaning a gas stream, which is replaceably positioned in a shaft of a duct system through which said gas stream is guided such that the filter separates an unfiltered side from a clean side, said filter comprising a filter frame, a filter element supported by the filter frame, and a shaft cover, wherein the shaft cover is constructed separately from the filter frame and attached thereto, and wherein the filter frame is removable from the shaft exclusively by using the shaft cover, wherein the filter frame comprises a frame wall which encloses a filter region; wherein the frame wall extends at a slant to said filter region; wherein the filter element comprises a non-woven filter web, and wherein said filter element is compressed in the vicinity of the frame wall.

9. An insert filter for cleaning a gas stream, which is replaceably positioned in a shaft of a duct system through which said gas stream is guided such that the filter separates an unfiltered side from a clean side, said filter comprising a filter frame, a filter element supported by the filter frame, and a shaft cover, wherein the shaft cover is constructed separately from the filter frame and attached thereto, and wherein the filter frame is removable from the shaft exclusively by using the shaft cover, wherein the insert filter is provided with a guide strip which is guided in a depression in the shaft to assure proper positioning of the filter element.

10. An insert filter according to claim 9, wherein an air filter is provided on both sides of the engine block.

* * * * *